United States Patent [19]

Dickey et al.

[11] 4,327,576

[45] May 4, 1982

[54] ACOUSTIC LEAK DETECTOR

[75] Inventors: Joseph W. Dickey, Annapolis; Paul M. Moore, Gaithersburg; Lloyd E. Powell, Annapolis, all of Md.

[73] Assignee: The United States of America as represented by the Secretary of the Navy, Washington, D.C.

[21] Appl. No.: 146,984

[22] Filed: May 5, 1980

[51] Int. Cl.³ .............................................. G01M 3/08
[52] U.S. Cl. ................................................ 73/40.5 A
[58] Field of Search ................ 73/40.5 A, 40.5 R, 659

[56] References Cited

U.S. PATENT DOCUMENTS

| | | | |
|---|---|---|---|
| 3,851,521 | 12/1974 | Ottenstein | 73/40.5 R |
| 4,083,229 | 4/1978 | Anway | 73/40.5 A |
| 4,289,019 | 9/1981 | Clayton | 73/40.5 A |

FOREIGN PATENT DOCUMENTS 54-136416  10/1979  Japan ............................... 73/40.5 A Primary Examiner—Jerry W. Myracle

[57] ABSTRACT

The invention relates to a leak detecting device for pipe systems having two electronic channels for processing the acoustical signals from the source of the leak to determine the direction of propagation of the leak signal. Each channel includes a transducer, an amplifier unit, a variable delay unit for delaying the transmission of signals received from the amplifier unit, and a multiple-averager unit which respectively multiplies and then averages input signals from the variable delay unit of the same channel and, depending on the mode of operation, from the amplifier unit of either the same or the other channel. Operating in a first mode to determine the frequency and wavelength of the primary leak signal, the signals from the variable delay unit of one channel are combined with the signals from the amplifier unit of the same channel in the multiplier-averager unit. Upon determining the wavelength of the primary leak signal, the transducers are spaced apart by about one-quarter of such wavelength and attached to the pipe. Operating then in a second mode to determine the direction of propagation of the acoustical leak signal, the multiplier-averager unit of one channel receives signals from the variable delay unit of the same channel and the amplifier unit of the other channel.

12 Claims, 24 Drawing Figures

ACOUSTIC LEAK DETECTOR

The invention described herein may be manufactured and used by or for the Government of the United States of America for governmental purposes without the payment of any royalties thereon or therefor.

BACKGROUND OF THE INVENTION

The present invention generally relates to a means for locating leaks in pipe systems and more particularly to a method and apparatus which utilizes acoustic signals generated at the source of the leak to determine the location thereof.

Numerous devices have been developed to detect the presence and/or magnitude of leaks in pipe systems. For example, a leak detecting system disclosed in U.S. Pat. No. 4,083,229 utilizes transducers on opposite sides of the suspected site of the leak to intercept the vibration or sound waves emanating therefrom. The transducers produce separate electrical signals, which are a function of the frequency of the intercepted soundwaves, and the extent of correlation between the two signals is varied with time delay means to establish the maximum correlation between the signals. The varied extent of the correlation is then used to enable the location of the leak to be determined. A further example of a related leak detecting system is disclosed in U.S. Pat. No. 3,851,521, which utilizes transducer means for detecting transient pressure changes in fluid pipelines. The transducer means are positioned at spaced apart locations along the pipeline such that a leak will occur between two adjacent transducer means. The signal from a transducer means is displaced or delayed in time by an amount corresponding to the location of the leak in relationship to a transducer means, and the location of the leak can be pinpointed according to (1) the time delay of the transducer signals, (2) the known distance between the transducers, and (3) the velocity of sound in the fluid pipeline.

Other leak detecting systems are generally disclosed in U.S. Pat. Nos. 3,170,152; 3,223,194; 3,264,864; 3,413,653; 3,500,676; 3,592,967; 3,626,750; 3,903,729; 3,930,556; and 4,075,601.

SUMMARY OF THE INVENTION

The present invention overcomes problems experienced with the prior art by providing means capable of determining the location of remote leaks in a pipe system. This is generally accomplished by utilizing a leak detecting means having two electronic channels for processing the acoustical signals from the source of the leak. Each channel includes a transducer means for converting acoustical vibrations in the pipe or conduit into electrical signals; an amplifier unit for amplifying the signals from the transducers; a variable delay unit for delaying the transmission of the signals from the amplifier; and a multiplier-averager unit which respectively multiples and then averages input signals from different electrical sources. The input signals for the multiplier-averager unit of each channel are sent from the variable delay unit of the same channel and, depending upon the mode of operation of the leak detecting means, also from the amplifier of one of the channels. The signals processed by the multiplier-averager units of each channel are fed to appropriate meters of the leak detecting apparatus whereupon the proper spacing of the transducers and/or the direction of the leak can be determined.

In one operational mode, the input signals for the multiplier-averager unit of one channel are sent from the amplifier and from the variable delay unit of the same channel so that the wavelength and, accordingly, the proper spacing for the transducers can be determined. The time delay of the signal from the variable delay unit is changed until the average magnitude of the signal from the multiplier-averager unit attains a minimum absolute value. A minimum signal value is indicative that the signal from the time delay unit has been delayed by one-quarter of the period of the detected dominant or primary leak signal or some multiple thereof.

After the wavelength of the dominant primary leak signal has been determined and the transducers have been spaced apart by about one-quarter of the wavelength of such signal and positioned on the conduit, the leak detecting apparatus is placed in the other operational mode to determine the direction of the leak. In this operational mode the multiplier-averager unit of each channel receives signals from the time delay unit of the same channel and from the amplifier of the other channel. The resultant signal processed by the multiplier-averager units of the two channels are then combined in a difference amplifier and the direction of propagation of the acoustical leak signal is displayed on an appropriate meter.

Accordingly, it is therefore an object of this invention to provide a novel method and apparatus for accurately and reliably locating the site of a fluid leak in a pipe system.

Another object of the present invention is to provide a method performed by an electronic device which detects remote leaks or breaks in pressurized vessels such as pipelines.

A further object of this invention is the provision of a leak detecting system which enables an operator thereof to quickly and reliably detect the presence of a fluid leak by intercepting acoustical waves therefrom.

Still another object of the present invention is to provide a reliable, compact and efficient instrument which is capable of operating in confined areas and which is sufficiently sensitive to locate small leaks in pipe systems.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may be best understood by reference to the following description taken in connection with the accompanying drawings, in which:

DETAILED DESCRIPTION OF THE DRAWINGS

Figure 1:
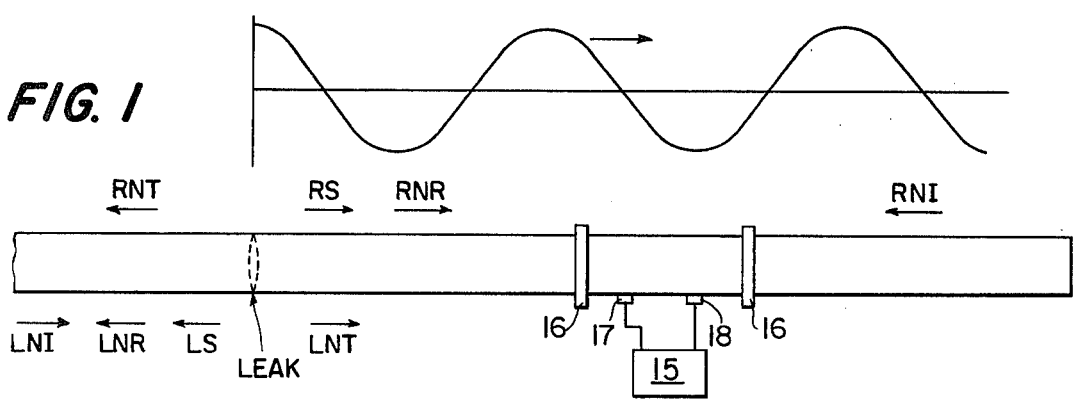
FIG. 1 shows a pair of transducers of the leak detection apparatus connected to a leaking pipe section with a leak therein.

Referring now to the drawings there is generally shown in FIG. 1 a pipe or conduit 11 with a leak detecting apparatus 15 attached thereto for determining the location of a leak in the pipe 11. Also shown in FIG. 1 are symbols for various acoustical noises which occur in the pipe 11 due to the leak and other sources not related to thereto referred to as noise, wherein the following letters have the assigned meanings:

LN = background noise originating from the left of the source of the leak;
RN = background noise originating from the right of the source of the leak;
LS = the acoustic signals emanating from the leak and traveling to the left;
RS = the acoustic signals emanating from the leak and traveling to the right;
I = the incident acoustic signal;
R = the reflected acoustic signal; and
T = the transmitted acoustic.

Thus, for example, the background noise originating from any region of the pipe 11 to the left of the leak location which passes through the region of the leak from the left would be denoted as LNT. Further, the leakage associated signal which travels to the right would be denoted as RS, and the background noise traveling from the right and reflected at the source would be denoted as RNR.

The acoustical noises are picked-up by spaced transducers 17, 18 and since the transducer arrangement of the present invention is designed to pickup and transmit the more direct RS or LS noises, the leak detecting apparatus 15 is arranged to detect whether the acoustic leak signals originate left or right of the transducer arrangement of FIG. 1. Further, although there are random RS or LS noises of different frequency and amplitude associated with the leaks, a predominant signal of a specific frequency is normally generated in the pipe or conduit 11. The frequency and velocity of such predominant signal is primarily dependent upon the type of pipe system (e.g., pressurized steam pipes) the fluid within the pipe and the materials which form the pipes or conduits.

Also, the leakage rate in most fluid systems can be inferred from the acoustic emissions if the amount of noise traveling in one direction along the pipe or conduit 11 can be measured independently of the amount of noise traveling in the opposite direction. For example, by attenuating and filtering-out background noise, a monochromatic, primary leak signal of angular frequency $\omega$ is effectively processed by the leak detecting apparatus wherein the signal at the left transducer 17 is $$V_L(t) = Ae^{i\omega t} + Be^{-i(\omega t + \delta)} \tag{1}$$

This equation is a well known relationship of wave analysis which states that any sinusoidal signal can be represented by two sinusoids traveling in opposite directions with some phase difference. A and B are the amplitudes of signals going from left to right and from right to left, respectively, and $\delta$, an unknown which is independent of the transducer spacing, is the phase difference between the signals at time t=0. Similarly, the signal at the right transducer 18 is $$V_R(t) = Ae^{i(\omega t - 2\pi n)} + Be^{-i(\omega t + \delta + 2\pi n)} \tag{2}$$

where n is the transducer spacing expressed as a number of wavelengths and the amplitudes A and B are not significantly changed over the separation distance between the transducers.

The signal at the right transducer 18 is electronically delayed in time by $2\pi n/\omega$, which is equal to the transducer spacing divided by the primary signal velocity so that $$V_R(t - 2\pi n/\omega) = Ae^{i(\omega t - 4\pi n)} + Be^{-i(\omega t + \delta)} \tag{3}$$

Subtracting equation (3) from equation (1) and solving for A results in $$A = e^{i\omega t}(V_L(t) - V_R(t - 2\pi n/\omega))/(1 - 1^{-i4\pi n}) \tag{4}$$

If the transducer spacing is set at one-quarter of a wavelength so that $n = \frac{1}{4}$, then $$A = e^{i\omega t}(V_L(t) - V_R(t - \pi/2\omega))/2 \tag{5}$$

which gives a measure of the amplitude of the signal which goes from left to right. Thus, by separating the transducers by an appropriate amount, the leak detecting apparatus is capable of detecting the direction of the leak in a pipe 11 and the magnitude of the leak.

It will now be shown that the ability to measure noise traveling in one direction on a pipe allows one to measure the amount of noise emanating from a point in the system. Referring again to FIG. 1, the total signal emanating from the source is the quantity which is to be measured and is defined using this notation as:

$$S = RS + LS \tag{6}$$

By being able, as shown in equation (5), to measure the amount of signal traveling in one direction at a point on the pipe means, we can measure the following quantities:

$$M_1 = RS + RNR + LNT \tag{7}$$

$$M_2 = RNI \tag{8}$$

$$M_3 = LNR + LS + RNT \tag{9}$$

$$M_4 = LNI \tag{10}$$

Where $M_1$ is the amplitude, defined in equation (5), of the signal to the right of the source in FIG. 1 which is also traveling to the right. Similarly, $M_2$ = amplitude to right of source traveling to the left,
$M_3$ = amplitude to left of source traveling to left, and
$M_4$ = amplitude to left of source traveling to right.

Also, since we know that the amount of signal incident in a wave must equal the sum of the reflected and transmitted parts, we have $$RNI + RNR + RNT \quad (11)$$

$$LNI + LNR + LNT \quad (12)$$

Putting equations (7) and (9) into (6) and combining equations (11), (12), (8), and (10) leaves:

$$S = M_1 + M_3 - M_2 - M_4 \quad (13)$$

which gives the source strength entirely in terms of measurable quantities.

The measurement of source strength, as described above, is enhanced by the dissipation and damping of the acoustic noises in the conduit 11. If there is little or no dissipation, the signal may be reflected at nearby discontinuities in the pipe system and return to the leak location, and thus be indistinguishable from the incident background noise. For example, signal RS in FIG. 1 may be reflected to the right of the transducer pair (17, 18) and return in the same direction as the incident background noise, RNI. With sufficient dissipation and damping, any reflected signal will have a much lower amplitude than the more direct signal RS. This noise damping may be further enhanced by noise attenuating means in the form of sound absorbing elements 16 shown in FIG. 1, which diminish the magnitude of an acoustical signal when it passes through the region of the pipe 11 surrounded by the sound absorbing elements 16. The sound absorbing elements 16 may comprise any lossy material capable of absorbing acoustical noises such as elastomers and rubber materials.

Figure 2:
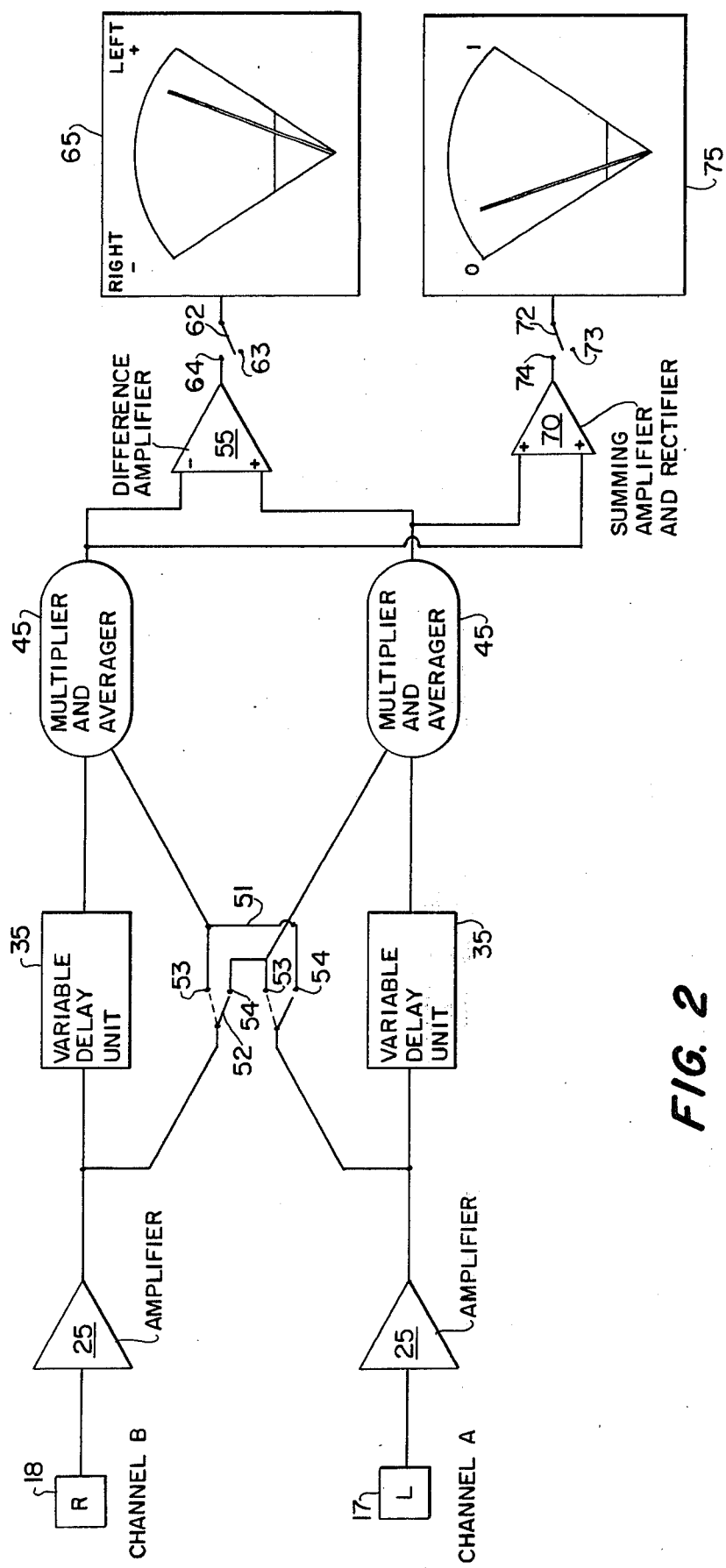
FIG. 2 is a simplified schematic diagram of the leak detecting apparatus of the present invention.

A simplified schematic of a preferred embodiment of the leak detecting apparatus is generally shown in FIG. 2. The leak detector includes two channels (A and B) of identical components, wherein channel A is associated with the left transducer 17 and channel B is associated with the right transducer 18. Each channel includes a transducer for converting acoustical vibrations into electrical signals; an amplifier unit 25 for amplifying the signals from the transducer; a variable delay unit 35 for delaying transmission of the signal from the amplifier; and a multiplier-averager unit 45, hereinafter referred to as a MA unit, which serves to multiply and then average two input signals. The acoustical leak detector 15 also includes a switch device 51 which, depending on the switch position, sends the signal from an amplifier 25 to either the MA unit 45 in the same channel or the MA unit 45 in the other channel. The signals from the two MA units 45 are then fed either to a difference amplifier 55 or a summing amplifier and rectifier 70 and meters for displaying, for example, the direction of propagation of the leakage signal.

When the switch elements 52 of the switch device 51 are shown in the position indicated by broken lines in FIG. 2, wherein they engage contacts 53, the signals from the amplifier unit 25 of one channel are sent to both the variable delay unit 35 and the MA unit 45 of the same channel. Also, the switch elements 72 for the summing amplifier and rectifier 70 are moved to engage the contacts 74 so that the sum of the resulting signals from the MA units 45 are displayed on the meter 75. In this mode of operation, the leak detector apparatus 15 is equipped to determine the wavelength of the predominant leakage signal and therefore, the proper spacing for the transducers 17, 18. The leak detector apparatus 15 of the preferred embodiment will operate most efficiently when the transducer spacing is one-quarter of the wavelength of the primary leak signal. This transducer spacing is generally established by changing the time delay of the signals from the variable delay units 35 until the magnitude of the signal displayed on the meter 75 is at a minimum value, which is indicative that the time delay has been set at one-quarter of a period of the primary leak signal. The time delay means for both channels are interconnected so that the time delay of the signals in the variable delay units 35 will be identical. Although only one channel is required to determine the wavelength of the primary leak signal and thus, the proper spacing for the transducers 17, 18, both channels are connected to the amplifier 70 to provide an improved measure of the proper transducer spacing.

Figure 3A:
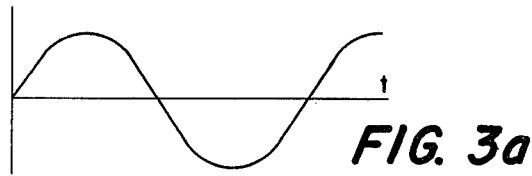
FIGS. 3a–c depict examples of waveforms of the primary leak signal which are processed by the leak detecting apparatus, operating in a first mode, when the time delay between the signals is less than one-quarter of the period of such primary leak signal.
Figure 3B:
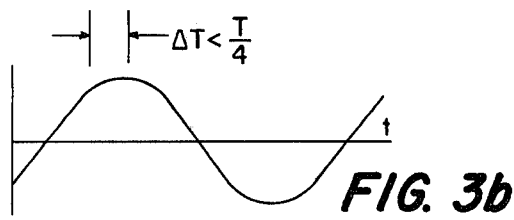
Figure 3C:
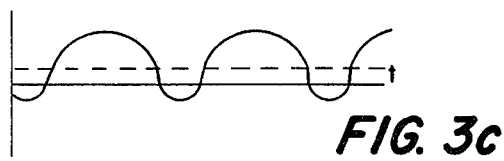
Figure 5A:
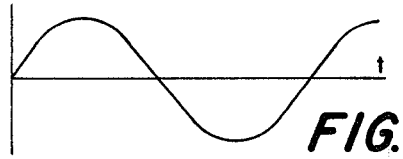
FIGS. 5a–c are similar to FIGS. 3a–c and FIGS. 4a–c except that the time delay between the signals is on the order of one-quarter of the period of the dominant primary leak signals.
Figure 5B:
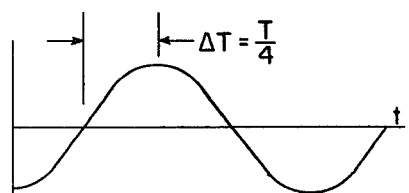
Figure 5C:
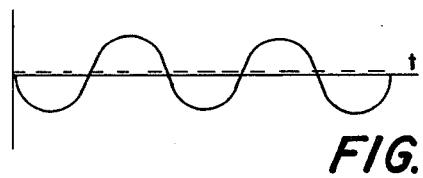
Figure 4A:
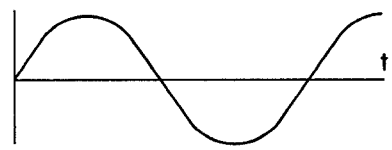
FIGS. 4a–c are similar to FIGS. 3a–c except that the time delay between the signals is greater than one-quarter of the period of the primary leak signal.
Figure 4B:
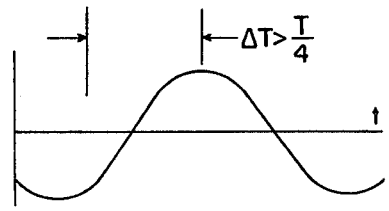
Figure 4C:
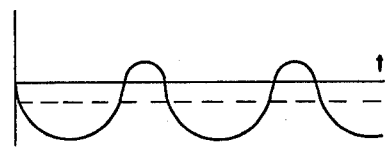

FIGS. 3a-c; FIGS. 4a-c; and FIGS. 5a-c are examples of the acoustical signals (shown as sinusoidal waveforms) processed by the leak detecting apparatus when the time delay of a variable delay unit 35 of one channel is respectively set at less than, greater than and equal to one-quarter of the period of the primary leak signal. FIG. 3a illustrates a waveform of the signal which is sent from an amplifier 25 directly to a MA unit 45 of the same channel and in FIG. 3b the signal from the amplifier 25 has been sent to the variable delay unit 35 and delayed in time ($\Delta T$) by less than one-quarter of a period before being sent to the MA unit 45. In FIG. 3c, the waveforms of FIGS. 3a and 3b have been multiplied together, as shown by the solid lines, and then the average value of the multiplied waveforms has been determined, as shown by the broken lines.

The waveforms shown in FIGS. 4a and 4b are the same as those in FIGS. 3a and 3b except that the time delay ($\Delta T$) of the signal passing through the variable delay unit 35 is greater than onequarter of the period of the primary leakage signal ($\Delta T \geq T/4$). In FIG. 4c, the waveforms of FIGS. 4a and 4b have been respectively multiplied, as shown in solid lines, and "averaged", as shown by the broken lines. Although the "average" magnitude of the solid waveform in FIG. 4c is shown as a negative quantity, the summing amplifier and rectivier 70 processes the signal as an absolute value that would be exhibited as a positive value on the meter 75.

When the time delay approaches one-quarter of the period of the primary leak signal ($\Delta T = T/4$), the resulting "average" magnitude of the multiplied waveform approaches zero, as shown in FIG. 5c. Thus, by sending the output signal from the MA unit 45 to a meter 75 or other indicating device and increasing the time delay from zero ($\Delta T = 0$), the "average" magnitude of the signal from the MA unit 45 will decrease to a minimum value of zero, thereby indicating a time delay of one-quarter of the period of the primary leak signal ($\Delta T = T/4$). Once the period (T) of such signal is determined and if one knows the velocity of the signal propagation in pipe 11, the wavelength ($\lambda$) can also be determined.

After the appropriate spacing for the transducers 17, 18 is determined and they have been secured to the pipe or conduit 11, the switch elements 52 are moved to engage the other contacts 54, as indicated by the solid lines in FIG. 2, so that the signals from the amplifier units 25 of one channel are sent to the time delay unit 35 of the same channel and to the MA unit 45 of the other channel. Also, the switch elements 72 for the amplifier 70 are moved to engage the contacts 73 and switch elements 62 are moved to engage contacts 64 so that the resulting signals from the MA units 45 are displayed on the meter 65. In such operating mode, the leak detection apparatus 15 is designed to determine the direction of propagation of the primary leak signal and, eventually, the location of the leak. The sinusoidal curve superimposed above the pipe 11 in FIG. 1 is representative of the primary leak signal, at time t=0, traveling from left to right wherein the transducers are spaced apart by approximately one-quarter of the wavelength of the waveform.

Figure 6A:
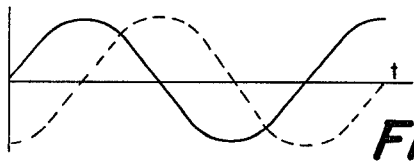
FIGS. 6a–d represent waveforms of signals processed in channel A of the leak detecting apparatus operating in a second mode.
Figure 7A:
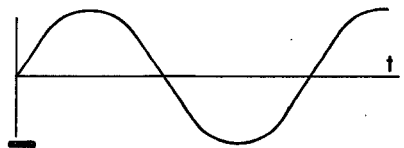
FIGS. 7a–d represent waveforms of signals processed in channel B of the leak detecting apparatus operating in a second mode.
Figure 6B:
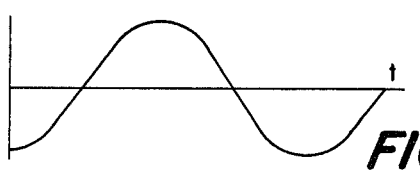
Figure 7B:
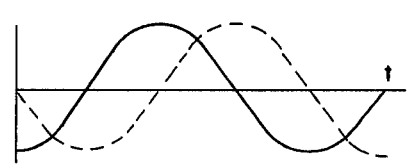
Figure 6C:
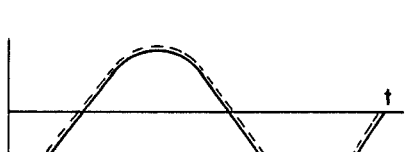
Figure 7C:
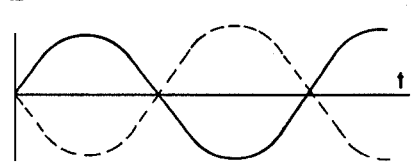
Figure 6D:
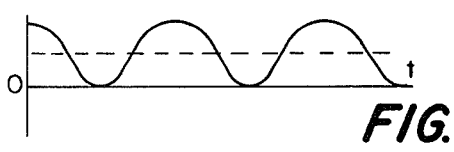
Figure 7D:
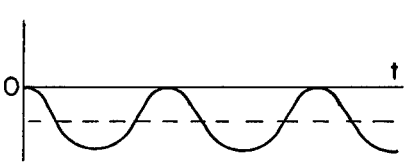
Figure 8A:
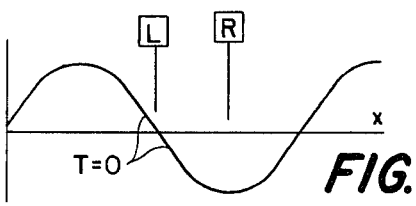
FIGS. 8a–d depict waveforms of signals processed in the leak detecting apparatus operating in a second mode over a period of time.
Figure 8C:
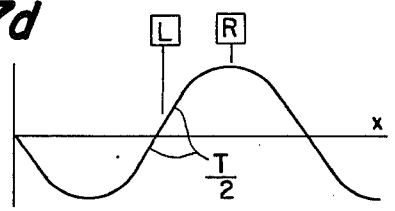
Figure 8B:
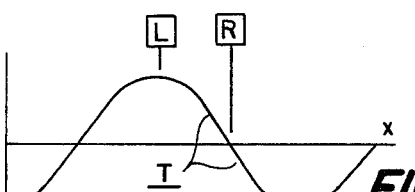
Figure 8D:
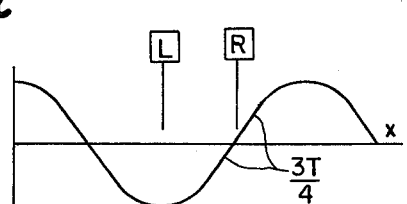

FIGS. 6a-d and 7a-d depict waveforms vs. time which are representative of the acoustical signals which are processed in channels A and B, respectively. In FIG. 6a, for example, the waveform of the signal sent from the amplifier unit 25 to the variable delay unit 35 of channel A is represented by the solid line and the waveform of the signal which is sent from the variable delay unit 35 to the MA unit 45 at the same time is represented by the broken line. FIG. 6b depicts the waveform of the signal which is sent from the amplifier unit 25 of channel B and, in FIG. 6c, the broken line waveform of FIG. 6a and the waveform of FIG. 6b have been superimposed to depict the phase coincidence of the signals presented to the MA unit 45. Thus, in FIG. 6d, the solid waveform illustrates the waveforms of FIG. 6c when multiplied together and the broken line waveform illustrates the average magnitude of the solid waveform in FIG. 6d. FIGS. 7a-d are similar to FIGS. 6a-d except that FIG. 7a depicts the waveform of the signal sent from the amplifier unit 25 of channel A to the MA unit 45 of channel B, and FIG. 7b depicts the waveforms of the signals which are respectively sent from the amplifier 25 of channel B to the variable delay unit (solid line) 35 and from the variable delay unit 35 to the MA unit (broken line) 45. As shown in both FIGS. 6a and 7b, the signals have been delayed by one-quarter of a period in the variable delay units 35 before being sent to the MA units 45 of the same channels.

The resulting signals from the MA units 45 are sent to the difference amplifier 55 wherein the magnitude of the signal from channel B is subtracted from the magnitude of the signal from channel A. The resulting magnitude causes the indicator needle of meter 64 to move to either a positive or a negative direction. A positive needle position would indicate that the primary leak signal and, accordingly, the location of the leak is occurring to the left of the transducers 17, 18 and a negative needle position would indicate that the location of the leak is right of the transducers 17, 18. By repositioning the transducers 17, 18 on pipe 11 towards the indicated source of the leak and repeating the procedure, the location of the leak can be determined. In summary, FIGS. 8a-d generally represent the physical waveforms as functions of position which are processed by the leak detecting apparatus at four points in time, (from t=0 to t=3T/4). The figures include the positions of the left and right transducers.

The table below generally indicates the magnitude of signals processed by the leak detecting apparatus at the particular times shown in FIGS. 8a-d, wherein L and R respectively refer to the amplified signal magnitudes from the left and right transducers. Similarly, L (delayed) and R (delayed) respectively refer to the time delayed signals in channel A and channel B. Thus, the MA unit 45 of channel A will multiply L (delayed)×R and the MA unit 45 of channel B will multiply R (delayed)×L. For a signal moving from left to right in the pipeline 11, as shown in FIGS. 8a-d, the resulting average combined values ((R×LD)−(L×RD)) from the difference amplifier 55 will be positive.

TABLE 1

| time | L | R | LD (delayed) | RD (delayed) | L × RD | R × LD |
|------|---|---|--------------|--------------|--------|--------|
| 0    | 0 | −β | −β | 0 | 0 | $β^2$ |
| T/4  | β | 0 | 0 | −β | $−β^2$ | 0 |
| T/2  | 0 | β | β | 0 | 0 | $β^2$ |
| 3T/4 | −β | 0 | 0 | β | $−β^2$ | 0 |

Figure 9:
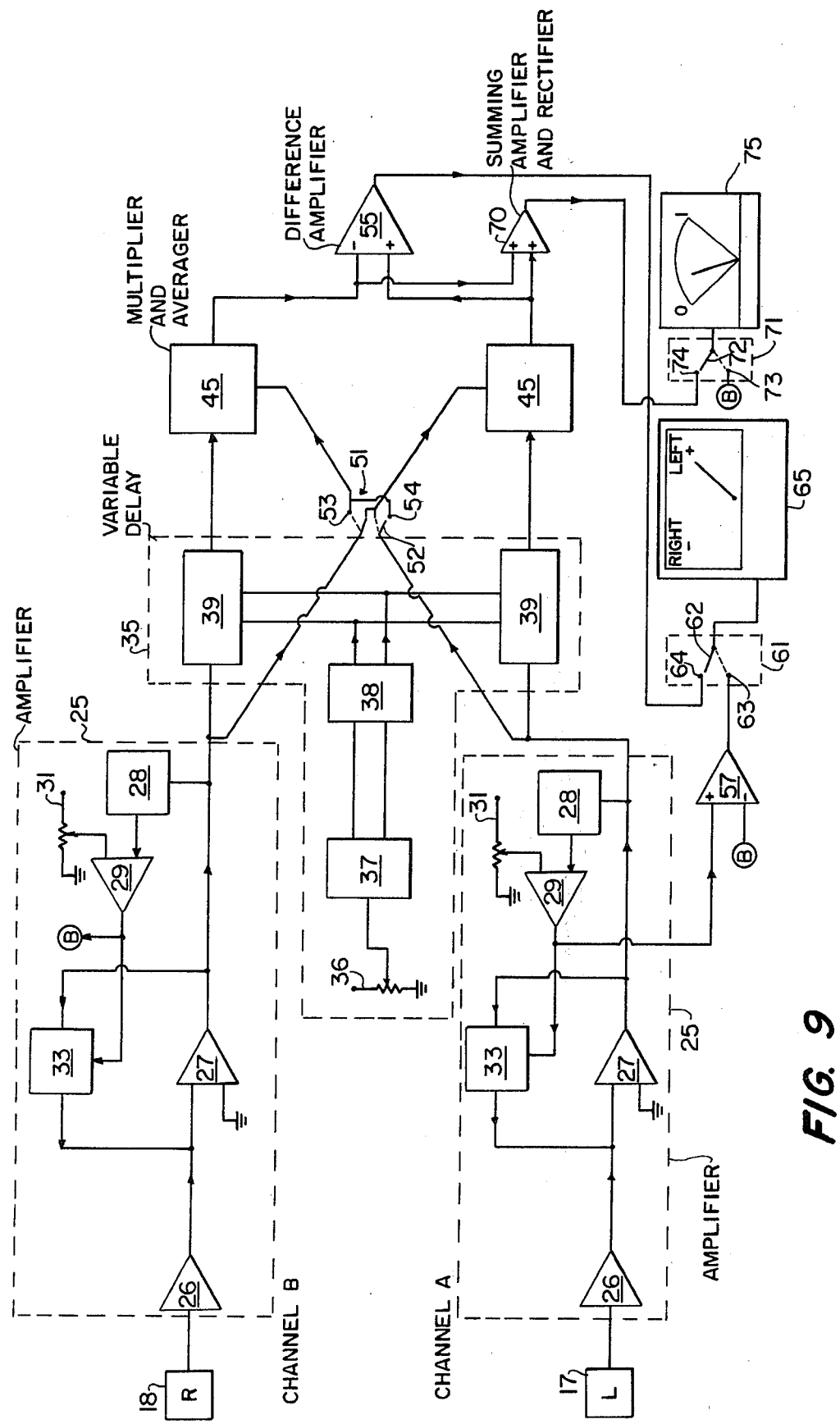
FIG. 9 is a detailed schematic of the acoustical leak detecting apparatus.

FIG. 9 is a detailed schematic of a preferred embodiment of the present invention wherein some of the signal processing units of FIG. 2 are designated by broken lines. As described above, the transducers 17, 18 are piezoelectric elements designed to convert acoustical vibrations in the pipe 11 into electrical signals. To prevent harmonic vibrations between the transducers 17, 18 and the pipe, the primary resonance frequency of the piezoelectric transducers 17, 18 should be above the primary resonance frequency of the pipe 11. Also, the transducers 17, 18 should have a high sensitivity and low noise level (such as Model 501 of the BBN Instrument Co., Cambridge, Mass.).

The electrical signals from the piezoelectric transducers 17, 18 are sent to the amplifier units 25 where the transducer signals are boosted to a value acceptable for further processing by other units of the leak detecting apparatus 15. The amplifier unit 25 includes a first amplifier element 26, such as Signetics Model 5534, which multiplies or amplifies the strength of the transducer signal by a gain of 25 db or 40 db. To filter or cancel out the unwanted low frequency signals, the amplifier element 26 may also contain a filter means which passes the high frequency signals. The second stage of the amplifier unit 25, which essentially comprises another amplifier element 27, a RMS (root-means-square) element 28, a difference amplifier 29, and a variable gain element 33, boosts the signals in each channel (A and B) an appropriate amount so that the signals from the amplifier units 25 will have approximately the same magnitude for further processing. Hence, the second stage amplifier element 27, (such as Signetics Model 5534) boosts the signal from amplifier element 26 according to the amplification value set by the variable gain 33. The RMS processor 28 (such as Raytheon Model 4200) computes the rootmean-square magnitude of the signal from the second amplifier element 27 and the difference amplifier 29 combines the "root" signal from the RMS processor 28 with a preset voltage source 31. The resultant signal from the difference amplifier 29 is sent to the variable gain 33, wherein the gain or amplification factor for the amplifier 27 is inversely proportional to the voltage from difference amplifier 29. Thus, if the voltage from the RMS processor 28 is too high, the gain or multiplication factor from the variable gain 33 will be decreased.

A measure of the relative strengths of the amplified signals can be viewed on the meter 65 shown in FIG. 9. This is accomplished by sending signals to the amplitude difference amplifier 57 from the difference amplifiers 29. The resulting signal from the amplitude difference amplifier 57 is sent through switch 61 to the meter 65 which indicates which of the signals in the amplifier units 25 of channels A and B are dominant and the relative extent of such dominance. Thus, if the signal strength in one channel is greatly in excess of the signal in the other channel, the voltage output sources 31 can be adjusted to properly increase or decrease the gain of the variable gain elements 33.

Although the variable delay units 35 of FIG. 2 are shown as separate units to simplify explanation of the operation of the leak detecting apparatus 15, a single variable delay unit 35 is actually connected to both channels A and B. The time delay of the signal in the variable delay unit 35 is set by adjusting the voltage output of control element 36, wherein, for example, the control element 36 may be calibrated between 1 and 500 megahertz. The control element 36 sends a signal to the clock element 37 which sends a square wave signal of appropriate frequency to the clock driver element 38 for further amplification. The time delay elements 39 (such as Reticon Model TAD-32 which is a tapped analog delay line) may be functionally described as a plurality of serially interconnected switches or gates which alternately open and close according to time intervals set by the frequency signal from the dual clock driver. Thus, a signal from the amplifier unit 25 must pass through the "gates or switches" before being sent to the MA units 45 and speed or frequency with which the signals from the clock element 37 "open and close" the gates determines the time delay of such signal.

In FIG. 9, the MA units 45, which may be constructed from Raytheon Model 4200 to respectively multiply the incoming signals and then compute the average value of such multiplied signals, are connected to difference amplifier 55 and summing amplifier and rectifier 70. The difference amplifier 55 subtracts the value of the signal in MA unit 45 of channel B from the value of the signal in MA unit 45 of channel A and the resultant signal from the difference amplifier 55 is the displayed on meter 65. As further shown in FIG. 9, the meter 65 is connected to both the difference amplifier 55 and additive amplifier 57 by a switch element 61.

The summing amplifier and rectifier 70 adds the values of the signals from the MA units 45 of both channels and then sends the absolute value of the resultant to the meter 75.

In addition to having a means for measuring the relative strengths of the signals in the amplifier units 25, there is also provided a means for measuring the raw or quantitative value of the signals from the amplifier units 25. This is accomplished, for example, by sending the signal from the difference amplifier 29 of channel B through switch 71 to meter 75. Thus, by moving switch element 72 from contact 74 to contact 73 a method is provided for measuring the strength of the leak signal and for determining the location of the leak by moving the transducers along a pipe section until the maximum strength of the leak signal is observed.

Obviously, many modifications and variations of the present invention are possible in the light of the above teachings. It is therefore to be understood that within the scope of the appended claims, the invention may be practiced otherwise than as specifically described.

What is claimed is:

1. A leak detecting and locating device for a fluid system having a leaking component within the system comprising:
   first and second processing channels adapted to be attached to a fluid system for converting acoustical signals from a leaking component into electrical signals;
   means for combining the electrical signals from said channels for determining the direction of the leaking component in the fluid system with respect to said first and second channels; and
   means receiving the combined signals for indicating the direction of the leaking component with respect to the detecting device, wherein each of said channels includes, a transducer mounted to receive, within a preselected frequency range, the characteristic dominant primary acoustical signals from the leaking component and to convert the acoustical signals to primary electrical signals;
   an amplifier unit for increasing the strength of the signal from the transducer;
   a variable delay unit for delaying the transmission of signals from said amplifier unit; and
   a means for processing the signals from said variable delay unit with the signal from the amplifier unit of one of said channels.

2. The device according to claim 1, further comprising:
   a switch means for interconnecting said first and second channels and positionable in either a first or second modal position, when said switch means is positioned in said first modal position the signals from said amplifier unit of one channel are combined in the processing means of said same channel with the signals from said variable delay unit of said same channel, and when said switch means is moved to said second modal position the signals from said amplifier unit of each channel are combined in the processing means of the other channel with the signals from said variable delay unit of the other channel.

3. The device according to claim 2, further comprising:
   a summing and rectifing means operable when said switch means is positioned in said first modal position and connected to said processing means of said one channel for displaying the average absolute magnitude of said signal from said processing means.

4. The device according to claim 2, further comprising a difference means operable when said switch means is positioned in said second modal position and connected to said processing means of each channel for subtracting the average magnitude of the signals from said processing means of said second channel from the average magnitude of the signals from said processing means of said first channel.

5. The device according to claim 1, further comprising means connected to said amplifier units of each channel for determining the relative magnitude of the signals in said amplifier units and means in each amplifier unit for adjusting the amplification magnitude of the signals processed therein.

6. The device according to claim 1, further comprising means connected to one of said amplifier units for detecting and displaying the magnitude of the amplified signal in said amplifier unit.

7. A method of determining the direction of propagation of acoustical leak signals in a pipe system utilizing two transducers spaced apart a predetermined distance comprising the steps of:
   receiving the acoustical signal from a common source by each transducer;

equalizing the signals from the transducers by separate amplification;

delaying each of said signals by a predetermined amount;

comparing the phase of the equalized signals from one transducer with the delayed signal from the other transducer; and displaying the resultant signal to indicate the direction to the source of said acoustical leak signal.

8. A method of determining the period of a predominant, primary acoustical signal caused by a leak in a fluid system comprising the steps of:

receiving an acoustical leak signal;

selecting from the received acoustical signals a predominant, primary leak signal;

varyiably delaying the primary leak signal with respect to itself; and processing said primary leak signal and said delayed primary leak signal to identify a 90° phase difference between said signals whereby a minimum absolute value output is produced.

9. A leak detecting and locating device for a fluid system having a leaking component within the system comprising:

first and second processing channels adapted to be attached to a fluid system for converting acoustical signals from a leaking component into electrical signals;

means for combining the electrical signals from said channels for determining the direction of the leaking component in the fluid system with respect to said first and second channels;

means receiving the combined signals for indicating the direction of the leaking component with respect to the detecting device, wherein said first and second channels include transducers attached to a pipe, in a spaced apart arrangement; and sound absorbing means spaced along the pipe adjacent the transducer arrangement for absorbing and attenuating the acoustical noise transmitted through the pipe to the transducers.

10. A leak detecting and locating device for a fluid system having a leaking component within the system comprising:

first and second processing channels adapted to be attached to a fluid system for converting acoustical signals from a leaking component into electrical signals;

means for combining the electrical signals from said channels for determining the direction of the leaking component in the fluid system with respect to said first and second channels; and means receiving the combined signals for indicating the direction of the leaking component with respect to the detecting device, wherein each of said channels includes:

a transducer mounted to receive the predominant, primary acoustic signals from the leaking component and to convert the acoustic signals to electrical signals;

means for equalizing the signal from one of said transducers with the signals from said transducer of the other channel;

means for delaying the signals from said equalization means a predetermined amount; and means for comparing the phase relationship of the delayed signal from the delay means of the same channel with the equalized signal from the delay means of the other channel.

11. A leak detecting and locating device for a fluid system having a leading component within the system comprising:

first and second processing channels adapted to be attached to a fluid system for converting acoustical signals from a leaking component into electrical signals;

means for combining the electrical signals from said channels for determining the direction of the leaking component in the fluid system with respect to said first and second channels; and means receiving the combined signals for indicating the direction of the leaking component with respect to the detecting device, wherein each of said channels includes, a transducer mounted to receive, within a preselected frequency range, the characteristic dominant primary acoustical signals from the leaking component and to convert the acoustical signals to primary electrical signals;

an amplifier unit for increasing the strength of the signal from the transducer;

a variable delay unit for delaying the transmission of signals from said amplifier unit; and a means for processing the signals from said variable delay unit with the signal from the amplifier unit of one of said channels, wherein in one mode of operation the amplified signal is fed from the amplifier unit in the same channel as the channel containing the variable delay unit.

12. A leak detecting and locating device for a fluid system having a leaking component within the system comprising:

first and second processing channels adapted to be attached to a fluid system for converting acoustical signals from a leaking component into electrical signals;

means for combining the electrical signals from said channels for determining the direction of the leaking component in the fluid system with respect to said first and second channels; and means receiving the combined signals for indicating the direction of the leaking component with respect to the detecting device, wherein each of said channels includes, a transducer mounted to receive, within a preselected frequency range, the characteristic dominant primary acoustical signals from the leaking component and to convert the acoustical signals to primary electrical signals;

an amplifier unit for increasing the strength of the signal from the transducer;

a variable delay unit for delaying the transmission of signals from said amplifier unit; and a means for processing the signals from said variable delay unit with the signal from the amplifier unit of one of said channels, wherein in one mode of operation the amplified signal is fed from the amplifier unit in a different channel than the channel containing the variable delay unit.

* * * * *